United States Patent Office 2,745,430
Patented May 15, 1956

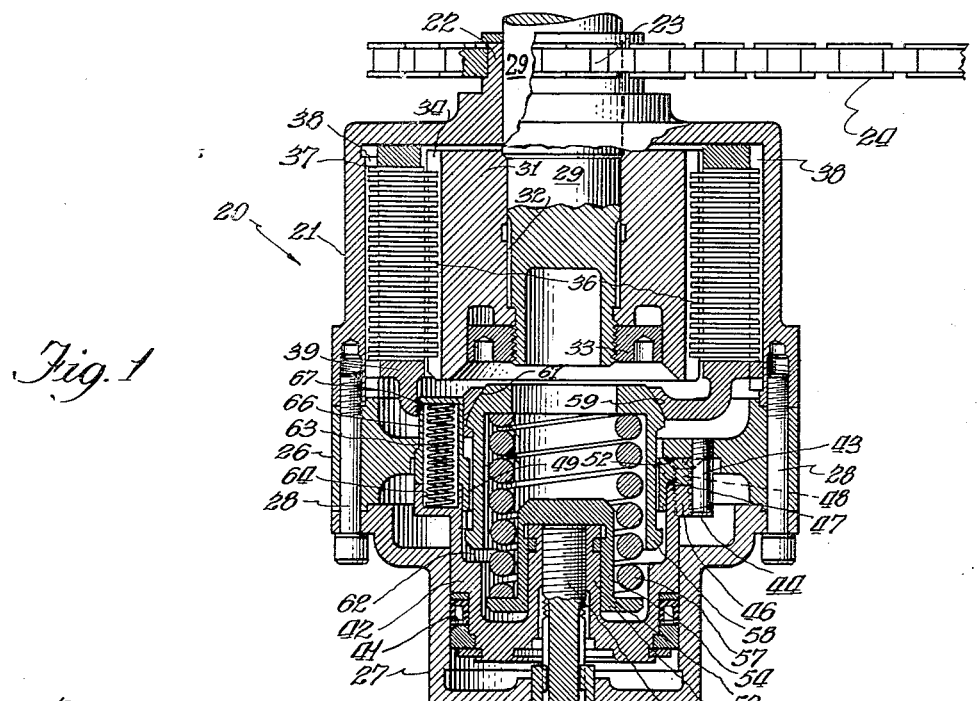

2,745,430

AUTOMATIC PRESSURE THROTTLING VALVE FOR FLUID PRESSURE SYSTEMS

Joseph J. Slomer, Chicago, Ill., assignor to Goodman Manufacturing Company, Chicago, Ill., a corporation of Illinois Application October 15, 1951, Serial No. 251,433

3 Claims. (Cl. 137—505.13)

This invention relates generally to hydraulic pressure systems and more particularly to improvements in valves for controlling the application of fluid pressure to a fluid operated motor, in such a fashion as to eliminate the possibility of shock created by the too rapid application of pressure to such motor.

In the operation of certain types of hydraulic devices, of which hydraulically operated clutches are a convenient example, the admission of hydraulic fluid is under the control of a simple on-off valve. The sudden application of pressure fluid has in the case of hydraulic clutches resulted in a large amount of shock being transmitted between the driving and driven elements of the clutch, and since the operator will in most cases fail to take the trouble to cause the pressure fluid to be admitted gradually by cracking the control valve slightly before admitting full fluid pressure to the clutch, it is desirable that some means be provided which will insure against the sudden application of fluid under pressure.

It is a principal object of this invention to provide a simple and effective valve mechanism which will prevent the unintended surge of hydraulic pressure fluid to a fluid operated device.

Another object is to afford an automatic pressure throttling valve so that the working pressure for a fluid operated clutch will be made available only at such desired increments as will enable the clutch or motor to operate smoothly.

Still another object comprehends the provision of a slave valve in a pressure supply line, which valve is fully automatic to provide increments in pressure of working fluid to the end that the fluid motor supplied with pressure fluid will be operated smoothly and without shock.

While the invention is herein disclosed in connection with a fluid operated clutch with which device the valve according to the present invention is particularly adaptable, it is contemplated that the valve may be used in conjunction with other hydraulic fluid operated devices wherein the need for a smooth application of pressure fluid is required. The preferred embodiment of the valve according to the present invention is illustrated in the drawing in which:

Fig. 1 is a longitudinal section through an automatic pressure throttling valve, said valve being shown connected to an hydraulically operated clutch; and Fig. 2 is a transverse section taken on the line 2—2 of Fig. 1 looking in the direction of the arrows.

Referring now to the drawing there is shown a pump 10 having a connection 11 to a reservoir of hydraulic fluid, not shown. The output from the pump 10 is connected by a line 12 through an on-off control valve 13 having a passageway 18 which passes fluid under pressure by way of a line 14 to an inlet port 16 of an automatic pressure throttling valve indicated generally by the reference numeral 15. Fluid under pressure is ported through the throttling valve 15 by a line 17 so that the pressure fluid is caused to operate, under circumstances as will presently appear, an hydraulically operated overload release clutch indicated generally by the reference numeral 20. The valve 13 is so arranged as to connect the clutch 20 and the valve 15 to tank, the valve 13 being rotatable so that the passageway 18 therein connects the line 14 directly to tank.

The hydraulically operated clutch 20 consists of a rotating housing 21 having a hollow stub shaft 22 extending therefrom and forming a support for a driving sprocket 23 made fast thereto and having trained therearound a driving chain 24. The rotating housing 21 also consists of an intermediate clutch mounting member 26 and an end closure 27, the housing 21, the intermediate clutch mounting member 26 and the end closure 27 being held together for rotation as a unit by cap screws 28.

A driven shaft 29 turns with respect to the clutch 20 during disengagement thereof within the hollow stub shaft 22 or with the hollow stub shaft 22 upon engagement of the clutch 20, and is provided with a splined hub 31 held thereto by a key 32 and a spanner nut 33 threaded to the inner end of the driven shaft 29. The exterior surface of the hub 31 is provided with splines 34 and clutch plates 36 which are movable on the splines 34. Clutch discs 37 are engaged with and movable upon internal splines 38 formed on the interior of the rotating housing 21.

A pressure plate 39 is also splined for rotation with the housing 21 and serves to place the clutch plates 36 and the clutch discs 37 into contact with each other so that rotation is transmitted from the driving sprocket 23 and housing 21 into the driven shaft 29.

The closure 27 has an internal concentric bore 41 for a moving piston 42 slidable therein. The piston 42 is hollow, for a purpose as will appear, and is held for rotation with the intermediate clutch mounting member 26 by a pin 43 tapped to the member 26 and engaged by a slot 44 formed in a skirt 46 of the piston 42. A split ring 47 is held to the skirt 46 by tapped and countersunk screws 48 and is provided with an annular lip 49 for a purpose as will appear.

Axial movement of the piston 42 is limited in one direction by an end wall 51 of the closure 27 and in the other direction by a stop shoulder 52 formed on the clutch mounting 26.

The piston 42 has an inward extending hollow boss 53 and a cup shaped adjusting carrier 54 is supported in telescoping arrangement on the boss 53. A flange 56 on the carrier 54 forms a movable abutment for an overload clutch release spring 57 which is bottomed at its other end on the inside of a hollow thrust member 58 movable telescopically with respect to the hollow piston 42. A spherical face 59 is formed on the thrust member 58 and mates with a similar spherical face 61 formed on the pressure plate 39.

The thrust member 58 is limited in its movement relative to the hollow piston 42 in one direction by a stop shoulder 62 formed within the hollow piston 42 and in the other direction by the annular lip 49.

The piston 42 is effectively urged in a direction to accomplish release of pressure on the pressure plate 39, and to this end compression springs 63 are interposed between a plurality of annular bores 64 formed in the skirt 46 of the piston 42 and cup shaped retainers 66 held in the intermediate clutch mounting member 26 and extending through openings 67 in the pressure plate 39.

An adjusting screw 68 is threaded within the interior of the hollow boss 53 and bears against the cup shaped adjusting carrier 54. The adjusting screw 68 is splined to a hollow shaft 70 having an adjusting spanner nut 69 at the end thereof, the shaft 70 being held in position of adjustment by socket head screws 71 spaced around the head of the nut 69 and tapped into a boss 72 extending from the end wall 51 of the closure 27. By rotating the nut 69 and shaft 70 the position of the carrier 54 is varied, at the same time the load on the spring 57 being adjusted in accordance with the desired overload setting of the clutch.

The hollow shaft 70 is provided with a pressure fitting 73 and a rotary coupling joint 74, which is connected to the pressure line 17 leading from the automatic pressure throttling valve 15. The splined connection between the hollow shaft 70 and the adjusting screw 68 is sufficiently free to afford passage for pressure fluid from the line 17 so that the pressure fluid is admitted behind the piston 42 to displace the piston against the compression of the return springs 63 until the piston is stopped by the shoulder 52. This movement of the piston 42 is accompanied by compression of the overload release spring 57 and loading of the clutch plates 36 and clutch discs 37 to drive the shaft 29.

If the torque transmitted to the shaft 29 exceeds a predetermined value the clutch discs and plates may slip while the driven shaft 29 remains stationary until the overload torque condition is corrected.

Ordinarily sudden application of pressure fluid at the hollow shaft 70 sometimes causes an unintended shock between the driving shaft 22 and driven shaft 29 causing the driving chain to be unduly strained or broken. The fluid at full pressure available to the clutch 20 by rapid opening of the valve 13, which ordinarily might create the condition complained of, is partially throttled so that fluid is admitted only at proper pressure and in sufficient quantity so as smoothly to fit the clutch discs and plates together before the application of full pressure. To this end the throttling valve is interposed in the pressure fluid supply line so that irrespective of whether the valve 13 is cracked open slowly or moved rapidly to the full open position the proper quantity and pressure of fluid will be admitted as described.

The valve 15 includes a valve body 76 having a longitudinal extending bore 77 therein. The bore 77 is closed at each end by end caps 78 and 79. A valve spool 81 is movable wtihin the bore 77 and is biased toward the end cap 78 by a spring 82 retained within a bore 83 in the valve spool 81 and bottomed at one end against the end cap 79 and at the other end against the bottom of the bore 83. The valve spool 81 also has a small pressure fluid bore 84 which is intersected by a radial pressure passageway 86 extending from the pressure fluid bore 84 to the cylindrical surface of the spool 81. A passageway 85 in the end cap 79 is intersected by a passageway 87 leading to tank, so that any fluid leaking past the spool 81 is bypassed to tank. The valve body 76 has an annular port 88 which is connected to the output pressure line 17 by a pressure fitting 89.

The dimensions of the valve spool 81 and the location of the radial pressure passageway 86 are so chosen that when pressure fluid is admitted to the valve at pressure inlet port 16 a desired sequence of operations takes place within the automatic pressure throttling valve 15. Under condition when the control valve 13 is turned to the off position pressure fluid for operating the clutch 20 will be ported to tank. The return spring 82 returns the spool 81 to a position bearing against the end cap 78. In so doing the passageway 86 is in alignment with the annular port 88. The admission of pressure fluid to the valve body 76 forces the spool 81 to the left against the force of the return spring 82. The initial flow of pressure fluid is through the passageway 84 and passageway 86 to the clutch 20, but the same pressure fluid also moves the spool to the left so that the passageway 86 is no longer in alignment with port 88. This initial movement is such as to provide a pressure against the piston 42 of an order sufficient to engage the clutch discs and plates smoothly and without shock. A V-passage 91 in the cylindrical surface of the spool 81 connects the pressure passageway 86 to the annular port 88 when the spool is in the position seen in the drawing. The V-passage 91 affords full pressure against the clutch piston 42 after the initial engagement of the clutch discs and plates by the passage of pressure fluid through the moving spool 81.

The fluid pressure required for leftwise opening movement of the spool 81 may be adjusted by varying the degree of compression of the spring 82 by using different members of shim discs 96, 96 between the spring and spool. For example, it, with the pair of shims shown in the drawing, the pressure needed in passage 16 to initiate leftwise opening movement is 50 pounds per square inch, addition of more shims would raise that pressure.

The movement of the spool 81 against the spring 82 is additionally opposed by a needle type throttle valve 92 having an integral threaded portion engaged with a suitably tapped opening in valve cap 79. An O-ring 97, carried by the valve 92 and engaged with a bore in the valve cap, prevents leakage of fluid past the threads. The valve 92 is adjusted to provide a predetermined spacing between itself and a valve seat 93 to thereby retard the flow of fluid behind the spool 81 to, in turn, retard the movement of the latter when pressure is applied at the inlet port 16. By thus controlling the rate of shifting movement of the spool, the flow of fluid from inlet port 16 can be controlled to cause smooth, shock-free engagement of the clutch discs and plates.

Pressure fluid continues to be supplied against the clutch piston 42 through the passages 84 and 86 and the V-shaped passage 91 until the clutch is released by operation of the control valve 13, at which time the springs 57 and and 63 of the clutch 20 disengage the clutch discs and plates, the fluid being returned through the valve 15. Upon operation of the valve 13 the spool 81 returns by the load in spring 82, the fluid being ported to tank through the valve 15.

From the foregoing description it will be seen that a simple form of valve structure has been provided which will automatically throttle the initial pressure of motive fluid for operating a fluid pressure operated clutch or similar fluid pressure operated device. The amount and rate of pressure available for providing initial movement of the clutch may be readily adjusted by varying the position of the set screw 94. Irrespective of the manner in which the control valve is operated, either slowly or rapidly, only sufficient fluid at proper pressure will be provided for initial clutch movement of the clutch discs and plates.

While the invention has been described in terms of a preferred embodiment thereof, other embodiments will be apparent to those having the benefits of the teachings herein, and it is therefore intended that the invention not be limited by the precise embodiment herein shown and only by the scope and breadth of the appended claims.

I claim:

1. An automatic pressure throttling valve for preventing shock on a fluid pressure operated device connected thereto and caused by the admission of pressure fluid to said device in excess of a desired amount, said automatic pressure throttling valve comprising a valve body having a bore therein, an inlet port at one end of said bore and coaxial therewith, an outlet port intersecting said bore, a piston type valve member movable in said bore and including spring means for urging said valve member toward said inlet port, a passageway in said valve member affording communication between said inlet port and said outlet port, said passageway including a passage in alignment with said outlet port when said valve member is in returned position by said spring means, said valve member being movable by pressure fluid at said inlet port to provide for fluid at a throttled pressure, further movement of said valve member thereby moving said passage out of alignment with said outlet port, and an additional passage of reduced cross sectional area formed in the surface of said movable valve member and together with said bore forming a means of communication for pressure fluid between said first named passage and said outlet port after said further movement of said valve member.

2. An automatic pressure throttling valve for preventing shock on a fluid pressure operated device connected thereto and caused by the admission of pressure fluid to said device in excess of a desired amount, said automatic pressure throttling valve comprising a valve body having a bore therein, an inlet port at one end of said bore and coaxial therewith, an outlet port intersecting said bore, a piston type valve member movable in said bore and including spring means for urging said valve member toward said inlet port, a passageway in said valve member affording communication between said inlet port and said outlet port, said passageway including a passage in alignment with said outlet port when said valve member is in returned position by said spring means, said valve member being movable by pressure fluid at said inlet port to provide for fluid at a throttled pressure, further movement of said valve member thereby moving said passage out of alignment with said outlet port, means comprising a valve for restricting the flow of fluid to and from a closed chamber behind said valve member when being moved by pressure fluid at said inlet port for regulating the rate of travel of said valve member whereby the throttling of said pressure fluid is kept at a desired value, and an additional passage of reduced cross sectional area communicating with said passage and said outlet port.

3. An automatic pressure throttling valve for preventing shock on a fluid pressure operated device connected thereto and caused by the admission of pressure fluid to said device in excess of a desired amount, said automatic pressure throttling valve comprising a valve body having a bore therein, an inlet port at one end of said bore and coaxial therewith, an outlet port intersecting said bore, a piston type valve member movable in said bore and including spring means for urging said valve member toward said inlet port, a passageway in said valve member affording communication between said inlet port and said outlet port, said passageway including a passage in alignment with said outlet port when said valve member is in returned position by said spring means, said valve member being movable by pressure fluid at said inlet port to provide for fluid at a throttled pressure, further movement of said valve member thereby moving said passage out of alignment with said outlet port, means comprising a valve for restricting the flow of fluid to and from a closed chamber behind said valve member when being moved by pressure fluid at said inlet port for regulating the rate of travel of said valve member whereby the throttling of said pressure fluid is kept at a desired value, and an additional passage of reduced cross sectional area formed in the surface of said movable valve member and forming a means of communication for pressure fluid between said first named passage and said outlet port after said further movement of said valve member.

References Cited in the file of this patent

UNITED STATES PATENTS

| | | |
|---|---|---|
| 824,425 | Johnson | June 26, 1906 |
| 1,128,077 | Taylor | Feb. 9, 1915 |
| 2,022,791 | Tetlow | Dec. 3, 1935 |
| 2,366,382 | Burton et al. | Jan. 2, 1945 |
| 2,384,227 | Albert | Sept. 4, 1945 |
| 2,418,325 | Wassall et al. | Apr. 1, 1947 |
| 2,472,694 | Chouings | June 7, 1949 |
| 2,525,908 | Jorgensen | Oct. 17, 1950 |
| 2,586,785 | Carr | Feb. 26, 1952 |

FOREIGN PATENTS

| | | |
|---|---|---|
| 12,049 | Great Britain | 1908 |
| 189,056 | Great Britain | 1922 |